US010066046B2

(12) United States Patent
Kinzelmann et al.

(10) Patent No.: US 10,066,046 B2
(45) Date of Patent: *Sep. 4, 2018

(54) ONE-COMPONENT LAMINATING ADHESIVE HAVING SILANE CROSS-LINKING

(75) Inventors: Hans-Georg Kinzelmann, Pulheim (DE); Pavel Gentschev, Bad Goisern (AT)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/548,703

(22) Filed: Jul. 13, 2012

(65) Prior Publication Data

US 2012/0328888 A1 Dec. 27, 2012

Related U.S. Application Data

(63) Continuation of application No. PCT/EP2010/068192, filed on Nov. 25, 2010.

(30) Foreign Application Priority Data

Jan. 14, 2010 (DE) ........................ 10 2010 000 881

(51) Int. Cl.
*B32B 7/04* (2006.01)
*B32B 7/12* (2006.01)
(Continued)

(52) U.S. Cl.
CPC ....... *C08G 18/0852* (2013.01); *C08G 18/289* (2013.01); *C08G 18/425* (2013.01); *C08L 27/08* (2013.01); *C09J 175/04* (2013.01); *B32B 7/04* (2013.01); *B32B 7/12* (2013.01); *B32B 15/04* (2013.01); *B32B 15/043* (2013.01); *B32B 15/08* (2013.01); *B32B 15/082* (2013.01); *B32B 15/085* (2013.01); *B32B 15/088* (2013.01); *B32B 15/09* (2013.01); *B32B 15/12* (2013.01); *B32B 23/04* (2013.01); *B32B 23/042* (2013.01); *B32B 23/06* (2013.01); *B32B 23/08* (2013.01); *B32B 27/08* (2013.01); *B32B 27/10* (2013.01); *B32B 27/30* (2013.01); *B32B 27/302* (2013.01); *B32B 27/304* (2013.01); *B32B 27/32* (2013.01); *B32B 27/34* (2013.01); *B32B 27/36* (2013.01); *B32B 2250/03* (2013.01); *B32B 2250/05* (2013.01); *B32B 2250/24* (2013.01); *B32B 2250/244* (2013.01); *B32B 2307/7242* (2013.01); *B32B 2307/7265* (2013.01); *C08G 18/3893* (2013.01); *C08G 18/4692* (2013.01); *C08G 63/695* (2013.01); *C08L 67/00* (2013.01); *C08L 67/02* (2013.01); *C08L 75/00* (2013.01); *C08L 75/04* (2013.01); *C08L 83/00* (2013.01); *C08L 83/06* (2013.01); *C09J 167/00* (2013.01); *C09J 167/02* (2013.01); *C09J 175/00* (2013.01); *C09J 183/00* (2013.01); *C09J 183/06* (2013.01); *C09J 2400/163* (2013.01); *C09J 2400/283* (2013.01); *C09J 2401/006* (2013.01); *C09J 2423/006* (2013.01); *C09J 2425/006* (2013.01); *C09J 2427/006* (2013.01); *C09J 2467/006* (2013.01); *C09J 2477/006* (2013.01); *Y10T 156/10* (2015.01); *Y10T 428/3179* (2015.04); *Y10T 428/3192* (2015.04); *Y10T 428/31678* (2015.04); *Y10T 428/31681* (2015.04); *Y10T 428/31692* (2015.04); *Y10T 428/31703* (2015.04); *Y10T 428/31728* (2015.04); *Y10T 428/31736* (2015.04); *Y10T 428/31757* (2015.04); *Y10T 428/31786* (2015.04); *Y10T 428/31797* (2015.04); *Y10T 428/31855* (2015.04); *Y10T 428/31888* (2015.04); *Y10T 428/31891* (2015.04);
(Continued)

(58) Field of Classification Search
None
See application file for complete search history.

(56) References Cited

U.S. PATENT DOCUMENTS 3,886,226 A * 5/1975 Asai et al. ................. 528/28
3,998,763 A * 12/1976 Bohnel ............... C08G 59/687
525/505

(Continued)

FOREIGN PATENT DOCUMENTS

DE 2307794 8/1973
DE 10 2008 020 979 A1 * 10/2009
(Continued)

OTHER PUBLICATIONS

"Boiling Points of Some Common Fluids or Gases" (http://mobile.engineeringtoolbox.com/boiling-points-fluids-gases-d_155.html) (webpage retrieved Dec. 15, 2012.*
"Lustran(R) SMA 245 Technical Data Sheet", dated 2007.*
International Search Report issued in connection with International Patent Application No. PCT/EP2010/068192 dated Feb. 28, 2011.
DIN ISO 2555, (Jun. 1.999).
ASTM D 1200, (Jul. 2010).

*Primary Examiner* — Vivian Chen

(74) *Attorney, Agent, or Firm* — James E. Piotrowski

(57) ABSTRACT

The invention relates to a crosslinkable one-component laminating adhesive containing 25 to 80 wt. % of polyester prepolymers, polyether prepolymers and/or polyurethane prepolymers, which have at least two cross-linkable alkoxysilane groups and have a molecular weight of 2000 to 30,000 g/mol, 75 to 19 wt. % of organic solvent having a boiling point up to 130° C., 1 to 20 wt. % of polymers which contain anhydride groups, and 0 to 15 wt. % of additives, wherein the viscosity of the adhesive is between 50 and 20,000 mPas (according to DIN ISO 2555), measured at 15 to 45° C.

15 Claims, No Drawings

(51) Int. Cl.

| | | |
|---|---|---|
| *B32B 15/04* | (2006.01) | |
| *B32B 15/08* | (2006.01) | |
| *B32B 15/082* | (2006.01) | |
| *B32B 15/085* | (2006.01) | |
| *B32B 15/088* | (2006.01) | |
| *B32B 15/09* | (2006.01) | |
| *B32B 15/12* | (2006.01) | |
| *B32B 23/04* | (2006.01) | |
| *B32B 23/06* | (2006.01) | |
| *B32B 23/08* | (2006.01) | |
| *B32B 27/08* | (2006.01) | |
| *B32B 27/10* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *C09J 167/00* | (2006.01) | |
| *C09J 167/02* | (2006.01) | |
| *C09J 175/00* | (2006.01) | |
| *C09J 175/04* | (2006.01) | |
| *C09J 183/00* | (2006.01) | |
| *C09J 183/06* | (2006.01) | |
| *C08G 63/695* | (2006.01) | |
| *C08L 67/00* | (2006.01) | |
| *C08L 67/02* | (2006.01) | |
| *C08L 75/00* | (2006.01) | |
| *C08L 75/04* | (2006.01) | |
| *C08L 83/00* | (2006.01) | |
| *C08L 83/06* | (2006.01) | |
| *C08G 18/08* | (2006.01) | |
| *C08G 18/28* | (2006.01) | |
| *C08G 18/42* | (2006.01) | |
| *C08L 27/08* | (2006.01) | |
| *C08G 18/46* | (2006.01) | |
| *C08G 18/38* | (2006.01) | |

(52) U.S. Cl.
CPC ............... *Y10T 428/31899* (2015.04); *Y10T 428/31902* (2015.04); *Y10T 428/31906* (2015.04); *Y10T 428/31909* (2015.04); *Y10T 428/31913* (2015.04); *Y10T 428/31935* (2015.04); *Y10T 428/31938* (2015.04)

(56) References Cited

U.S. PATENT DOCUMENTS

| | | | | |
|---|---|---|---|---|
| 4,191,714 A * | 3/1980 | Yonezawa et al. | ............. | 525/102 |
| 4,239,806 A * | 12/1980 | Hsieh et al. | .................. | 428/462 |
| 4,322,330 A * | 3/1982 | Merz | ...................... | C09J 157/00 523/221 |
| 4,424,900 A * | 1/1984 | Petcavich | ..................... | 206/720 |
| 4,503,189 A * | 3/1985 | Igarashi et al. | ............... | 525/104 |
| 4,658,958 A * | 4/1987 | McNulty et al. | ............. | 206/720 |
| 4,699,830 A * | 10/1987 | White | .......................... | 428/35.3 |
| 4,756,414 A * | 7/1988 | Mott | ................................ | 206/720 |
| 4,818,790 A * | 4/1989 | Ooka et al. | .................... | 525/103 |
| 4,851,283 A * | 7/1989 | Holtrop et al. | ............... | 442/370 |
| 4,889,915 A * | 12/1989 | Brauer et al. | .................. | 525/458 |
| 5,097,949 A * | 3/1992 | Heldwein | ....................... | 206/720 |
| 5,143,995 A | 9/1992 | Meckel et al. | | |
| 5,162,452 A * | 11/1992 | Herzig et al. | .................. | 525/403 |
| 5,274,039 A * | 12/1993 | Sirinyan | .................. | B05D 7/02 525/130 |
| H0001279 H * | 1/1994 | Stephenson | ................. | 524/317 |
| 5,319,024 A * | 6/1994 | Ishidoya et al. | .............. | 525/123 |
| 5,597,979 A * | 1/1997 | Courtney et al. | ............. | 174/378 |
| 5,928,748 A * | 7/1999 | Jones | .................. | A45D 40/0087 239/34 |
| 5,990,257 A * | 11/1999 | Johnston et al. | ............... | 528/28 |
| 6,001,924 A * | 12/1999 | Dobert et al. | ................. | 524/591 |
| 6,309,742 B1 * | 10/2001 | Clupper et al. | ............. | 428/304.4 |
| 6,437,072 B1 * | 8/2002 | Jyono et al. | ..................... | 528/25 |
| 6,762,241 B1 * | 7/2004 | Blum et al. | ................... | 524/588 |
| 6,943,288 B1 * | 9/2005 | Miska | .................. | H05K 9/0015 174/388 |
| 7,071,280 B2 * | 7/2006 | Ikeda et al. | ...................... | 528/73 |
| 7,557,173 B2 * | 7/2009 | Bachon et al. | ................. | 528/35 |
| 7,635,743 B2 * | 12/2009 | Wintermantel et al. | ........ | 528/59 |
| 7,714,080 B2 * | 5/2010 | Akiba et al. | ................... | 525/476 |
| 7,807,756 B2 * | 10/2010 | Wakabayashi et al. | ...... | 525/374 |
| 7,910,213 B2 * | 3/2011 | Yoshida et al. | ............. | 428/423.1 |
| 8,080,287 B2 * | 12/2011 | Martz et al. | ................... | 427/387 |
| 8,178,645 B2 * | 5/2012 | Popa et al. | ....................... | 528/69 |
| 8,697,800 B2 * | 4/2014 | Gentschev et al. | ............ | 524/590 |
| 2002/0157780 A1 * | 10/2002 | Onusseit | .................... | 156/273.7 |
| 2004/0084138 A1 * | 5/2004 | Henke et al. | ............... | 156/272.2 |
| 2004/0120131 A1 * | 6/2004 | Arnold | .................. | H05K 9/003 361/818 |
| 2005/0165169 A1 * | 7/2005 | Levey et al. | ................... | 525/192 |
| 2005/0170086 A1 * | 8/2005 | Tynan, Jr. | ............... | B01F 7/145 427/207.1 |
| 2006/0252903 A1 * | 11/2006 | Wakabayashi | ........... | C08K 5/09 528/34 |
| 2007/0100111 A1 * | 5/2007 | Stanjek et al. | .................. | 528/44 |
| 2007/0179242 A1 | 8/2007 | Landon | | |
| 2007/0293908 A1 * | 12/2007 | Cowan et al. | ................... | 607/45 |
| 2008/0057316 A1 * | 3/2008 | Landon | .................. | C08G 18/10 428/423.1 |
| 2008/0114098 A1 * | 5/2008 | Griswold | ............. | A61K 9/7069 524/55 |
| 2008/0245476 A1 * | 10/2008 | Loth | .................... | C09D 201/10 156/329 |
| 2008/0293908 A1 * | 11/2008 | Ludewig et al. | ................ | 528/26 |
| 2009/0012322 A1 * | 1/2009 | Bockholt et al. | ............. | 556/421 |
| 2009/0233033 A1 * | 9/2009 | Griswold | ................ | C08G 18/12 428/41.8 |
| 2009/0311459 A1 * | 12/2009 | Griswold | ................ | C08G 18/10 428/41.8 |
| 2010/0010156 A1 * | 1/2010 | Kollbach | ................. | B32B 7/12 524/589 |
| 2010/0071849 A1 * | 3/2010 | Knott et al. | ................... | 156/329 |
| 2010/0249357 A1 * | 9/2010 | Popa et al. | ..................... | 528/26 |
| 2011/0034627 A1 * | 2/2011 | Boudet et al. | ................. | 524/588 |
| 2012/0103516 A1 * | 5/2012 | Gentschev et al. | ........... | 156/329 |
| 2012/0277373 A1 * | 11/2012 | Zander et al. | ................ | 524/590 |
| 2012/0282444 A1 * | 11/2012 | Zander et al. | ................ | 428/195.1 |
| 2013/0199725 A1 * | 8/2013 | Gentschev et al. | ........... | 156/334 |

FOREIGN PATENT DOCUMENTS

| | | | |
|---|---|---|---|
| DE | 102009026900 | | 12/2010 |
| EP | 0464483 | | 1/1992 |
| EP | 1550704 | | 7/2005 |
| EP | 1674546 | | 6/2006 |
| EP | 1816168 | | 8/2007 |
| EP | 1985679 A1 | | 10/2008 |
| JP | 60-019525 | * | 1/1985 |
| JP | 01-054036 | * | 3/1989 |
| JP | 06-115037 | * | 4/1994 |
| JP | 2008297545 | | 12/2008 |
| JP | 2009525387 | | 7/2009 |
| KR | 20050065341 A | | 6/2005 |
| WO | 2007089705 | | 8/2007 |
| WO | 2008027496 | | 3/2008 |
| WO | WO 2008-071470 | * | 8/2009 |

\* cited by examiner

ONE-COMPONENT LAMINATING ADHESIVE HAVING SILANE CROSS-LINKING

The invention relates to an adhesive based on polyurethane prepolymers containing hydrolyzable silane groups for bonding flat substrates. The invention further relates to the use of this adhesive as a laminating adhesive for multilayer films.

Transparent NCO-crosslinking one-pack adhesives as a reaction product of polyols and isocyanates are known in EP 0464483, where isocyanates which comprise urea groups are used. These urea groups give high hydrogen bonding and thus, generally, a high viscosity of the polymer. Furthermore, monomeric isocyanates in the production of polymers lead to a residual monomer content of harmful isocyanates which has to be reduced by additional measures.

In addition, U.S. Pat. No. 5,990,257 is known. This describes a method of preparing polyurethanes having silyl groups, wherein isocyanates are used in a substoichiometric quantity relative to polyols. Further OH groups are then reacted with isocyanatosilanes to form silyl-containing prepolymers. The polymers have a molecular weight of more than 12000 g/mol. The viscosity is greater than 57 Pa·s. As an application, a use as a sealant is described, which should exhibit low tack after curing.

The as yet unpublished DE 102009026900 describes laminating adhesives that contain alcohols as solvents. For this purpose, prepolymers based on polyurethanes are described, which contain crosslinkable silane groups. However, these adhesives have a high content of alcohols, e.g. methanol or ethanol.

In addition, EP 1674546 is known. In this, moisture-curing compositions are described which are obtained from NCO group-containing polyurethanes, which are reacted with nucleophilically substituted silanes. The rapid reaction of these adhesives with moisture is described. The adhesives are used as hot-melt adhesives, i.e. they are solids at room temperature and are only to be applied hot.

The compositions of the prior art have various disadvantages when used as a laminating adhesive. Isocyanate-containing adhesives are not generally recognized as safe on occupational health and safety grounds. Furthermore, storage is only possible under strictly anhydrous conditions. Silane-curing systems contain carboxylic acids or alcohols, or form them during crosslinking. These are likewise physiologically harmful, and these substances can also have a negative effect on the contents of film packaging.

The object of the present invention is therefore to provide an adhesive with low viscosity at room temperature, which can be applied in a thin layer onto large areas of substrates. It should exhibit good adhesion to the substrates and rapid development of adhesion. After crosslinking, the adhesive layer should not, if possible, have any migratable physiologically harmful ingredients, e.g. primary aromatic amines or alcohols.

The invention is achieved by a crosslinkable one-pack laminating adhesive containing 25 to 80 wt. % polyester prepolymers, polyether prepolymers and/or polyurethane prepolymers which have at least two hydrolyzable alkoxysilane groups and the prepolymer possesses a molecular weight of 2000 to 30000 g/mol, 75 to 20 wt. % organic solvents with a boiling point of up to 130° C., 1 to 20 wt. % polymers, oligomers and/or monomers which contain anhydride groups, 0 to 15 wt. % additives, the viscosity of the adhesive being between 50 and 20000 mPas (according to DIN ISO 2555), measured at 15 to 45° C.

Suitable polyesters for the production of prepolymers according to the invention are the known polyester polyols, e.g. in the form of polyester polyols or polyurethane polyols, which are reacted at a minimum of two sites with bifunctional silane compounds containing a group that is reactive with the polymer backbone and additionally at least one crosslinkable silane group. In particular, the polyester polyols should have greater than/equal to two OH groups.

Suitable polyester polyols can be produced, for example, by polycondensation. For instance, difunctional and/or trifunctional low molecular weight alcohols can be condensed with a substoichiometric quantity of dicarboxylic acids and/or tricarboxylic acids. Instead of free polycarboxylic acids, the corresponding polycarboxylic acid anhydrides or corresponding polycarboxylic acid esters with alcohols having preferably 1 to 3 C atoms can also be used. Suitable dicarboxylic acids are e.g. succinic acid, adipic acid, suberic acid, azelaic acid, sebacic acid and higher homologues thereof having up to 16 C atoms, and also unsaturated dicarboxylic acids such as maleic acid or fumaric acid, dimer fatty acid or trimer fatty acid or aromatic dicarboxylic acids, in particular the isomeric phthalic acids, such as phthalic acid, isophthalic acid or terephthalic acid, anhydrides such as e.g. tetrahydrophthalic anhydride, hexahydrophthalic anhydride, glutaric anhydride, maleic anhydride, or mixtures of two or more of such acids. As tricarboxylic acids of which portions may optionally be added, citric acid or trimellitic acid are suitable, for example. The quantities are selected so that terminal OH-functional polyester diols are obtained. In a preferred embodiment, mixtures of aliphatic and aromatic carboxylic acids are contained.

Suitable for reaction with the above-mentioned carboxylic acids are, in particular, aliphatic alcohols. The suitable aliphatic alcohols include, for example, ethylene glycol, propylene glycol, 1,4-butanediol, 1,5-pentanediol, 1,6-hexanediol, 1,7-heptanediol, 1,8-octanediol and higher homologues or isomers thereof, 1,4-hydroxymethylcyclohexane, 2-methyl-1,3-propanediol, triethylene glycol, ethylene glycol, polyethylene glycol, dipropylene glycol, polypropylene glycol, dibutylene glycol and polybutylene glycol Also suitable are higher-functional alcohols, such as e.g. glycerol, trimethylolpropane, pentaerythritol, neopentyl glycol and oligomeric ethers of the substances mentioned with themselves or in a mixture of two or more of the ethers mentioned.

Suitable polyols for producing the polyesters are also reaction products of low molecular weight polyfunctional alcohols with alkylene oxides, so-called polyethers. The alkylene oxides preferably have 2 to 4 C atoms. Suitable examples are the reaction products of ethylene glycol, propylene glycol, the isomeric butanediols, hexanediols or 4,4'-dihydroxydiphenylpropane with ethylene oxide, propylene oxide or butylene oxide, or mixtures of two or more thereof. Also suitable are the reaction products of polyfunctional alcohols, such as glycerol, trimethylolethane or trimethylolpropane, pentaerythritol or sugar alcohols, or mixtures of two or more thereof, with said alkylene oxides to form polyether polyols. These should have a molecular weight of about 400 to about 2000 g/mol.

Also suitable are polyester polyols which are formed by reaction of low molecular weight alcohols, in particular ethylene glycol, diethylene glycol, neopentyl glycol, hexanediol, butanediol, propylene glycol, glycerol or trimethylolpropane, with lactones, in particular caprolactone. 1,4-Hydroxymethylcyclohexane, 2-methyl-1,3-propanediol, 1,2,4-butanetriol, triethylene glycol, tetraethylene glycol, polyethylene glycol, dipropylene glycol, polypropylene glycol, dibutylene glycol and polybutylene glycol are also suitable as alcohols.

However, polyester polyols of oleochemical origin can also be used. Oleochemical polyols are understood to mean polyols based on natural oils and fats, e.g. the reaction products of epoxidized fatty substances with mono-, di- or polyfunctional alcohols or glycerol esters of long chain fatty acids which are at least partially substituted with hydroxyl groups. Polyester polyols of this type can be produced, for example, by complete ring opening of epoxidized triglycerides of an at least partially olefinically unsaturated fatty acid-containing fat mixture with one or more alcohols having 1 to 12 C atoms and subsequent partial transesterification of the triglyceride derivatives to form alkyl ester polyols having 1 to 12 C atoms in the alkyl residue. Other suitable polyols are polycarbonate polyols and dimer diols (Henkel) as well as castor oil and its derivatives.

Methods for the production of OH-functional polyesters of this type are known. Polyester polyols of this type are also commercially available.

Another class of polyols suitable as a polymer backbone is the polyether polyols. Suitable as polyether polyols are the known reaction products of diols or triols, such as ethylene glycol, 1,2- or 1,3-propylene glycol, 1,4- or 1,3-butylene glycol, 1,6-hexanediol, 1,8-octanediol, neopentyl glycol, 1,4-hydroxymethylcyclohexane, 2-methyl-1,3-propanediol, glycerol, trimethylolpropane, 1,2,6-hexanetriol, with alkylene oxides, such as e.g. propylene oxide or butylene oxide. These polyols can have two or three OH groups. Polyether polyols of this type are commercially available.

The molecular weight of suitable polyols should be approx. 400 to 25,000 g/mol (number average molecular weight, $M_N$, as determined by GPC), in particular from 2,000 to 20,000 g/mol. If mixtures of polyols are used to produce the prepolymers, preferably at least 50% polyester polyols should be used, in particular exclusively polyester polyols, particularly preferably polyester diols with terminal OH groups.

In one embodiment, prepolymers containing NCO groups can be produced from the polyester and/or polyether polyols described above, by reacting with an excess of diisocyanates. Here, the polyols are reacted in liquid or molten form, optionally also containing solvents, with diisocyanates. This can also be supported by an elevated temperature, and it is also known that small quantities of catalysts can be added. Through the selection of the isocyanates and the quantity, it can be ensured that only small proportions of free, unreacted diisocyanates are present in the reaction mixture. If necessary, it is also possible to separate excess monomeric isocyanates by distillation. Such methods are known to the person skilled in the art. In this case the polyester can contain only terminal NCO groups, or polyurethane prepolymers with reactive NCO groups are formed by molecular weight build-up. These polyurethane prepolymers are also suitable for the synthesis of the silane-containing prepolymers to be used according to the invention.

As isocyanates, in particular the known aliphatic or aromatic diisocyanates are suitable, such as 1,6-hexamethylene diisocyanate (HDI), 1-isocyanato-3,3,5-trimethyl-5-isocyanatomethylcyclohexane (IPDI), xylylene diisocyanate (XDI), tetramethylxylylene diisocyanate (TMXDI), 2,4- or 2,6-toluene diisocyanate (TDI), 2,4'-diphenylmethane diisocyanate, 2,2'-diphenylmethane diisocyanate or 4,4'-diphenylmethane diisocyanate (MDI) and isomer mixtures thereof, cyclohexyl diisocyanate (CHDI), hexahydroxylylene diisocyanate (HXDI), m-xylylene diisocyanate (XDI), naphthalene diisocyanate (NDI) or bitolylene diisocyanate (TODI). The quantity is selected such that an NCO-terminated prepolymer is obtained.

In one embodiment of the invention, these NCO group-containing reaction products are then reacted with silanes which contain hydrolyzable silane groups in addition to a nucleophilic group.

As suitable silanes, organofunctional silanes such as hydroxy-functional, mercapto-functional or amino-functional silanes of the general formula

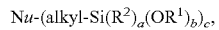

with Nu=NH, NH$_2$, SH, OH
alkyl=C$_1$, C$_2$, C$_3$, C$_4$, C$_6$, linear or branched or cycloalkyl
R$^2$=methyl, ethyl, propyl, butyl,
a=0, 1,
R$^1$=alkyl residue having 1 to 20 C atoms or H
B=2, 3,
C=1, 2 are employed. The silane group should contain at least one, preferably two or three, hydrolyzable residues. In particular, C$_1$ to C$_6$ alcohols or OH groups are suitable. These residues can be contained either exclusively or in a mixture at the silicon atom. In addition, 0 or 1 alkyl group can be contained at the silicon atom, in particular methyl, ethyl, propyl or butyl groups. In particular, tri- or dialkoxysilanes with methoxy, ethoxy, propoxy or butoxy groups are suitable.

Examples of mercapto-functional silanes are 3-mercaptopropyltrimethoxysilane, 3-mercaptopropyltrimethoxysilane or the corresponding alkyldimethoxy or alkyldiethoxy compounds. Examples of amino-functional silanes are 3-aminopropyltrimethoxysilane (AMMO), 3-aminopropyltriethoxysilane (AMEO), 3-aminopropylmethyldimethoxysilane, 3-aminopropylmethyldiethoxysilane, N-(2-aminoethyl)-3-aminopropyltrimethoxysilane (DAMO), N-(2-aminoethyl)-3-aminopropyltriethoxysilane, N-(2-aminoethyl)-3-aminopropylmethyldimethoxysilane, N-(2-aminoethyl)-3-aminopropylmethyldiethoxysilane, N,N-di(2-aminoethyl)-3-aminopropyltrimethoxysilane, N,N-di(2-aminoethyl)-3-aminopropyltriethoxysilane, N,N-di(2-aminoethyl)-3-aminopropylmethyldimethoxysilane, N,N-di(2-aminoethyl)-3-aminopropylmethyldiethoxysilane, N-(2-aminoethyl)-N'-(2-aminoethyl)-3-aminopropyltrimethoxysilane, N-(2-aminoethyl)-N'-(2-aminoethyl)-3-aminopropyltriethoxysilane, N-(2-aminoethyl)-N'-(2-aminoethyl)-3-aminopropylmethyldimethoxysilane, N-(2-aminoethyl)-N'-(2-aminoethyl)-3-aminopropylmethyldiethoxysilane), bis(triethoxysilylpropyl)amine, bis(trimethoxysilylpropyl)amine, N-(2-aminobutyl)-3-aminopropyltriethoxysilane, N-(2-aminobutyl)-3-aminopropyltrimethoxysilane, N-(n-butyl)-3-aminopropyltrimethoxysilane, N-(n-butyl)-3-aminopropyltriethoxysilane, N-(n-butyl)-3-aminopropylalkoxydiethoxysilane, 3-hydroxypropyltrimethoxysilane, 3-hydroxypropyltriethoxysilane, 4-hydroxybutyltrimethoxysilane or mixtures thereof as well as corresponding compounds which carry another alkyl group instead of the respective propyl group. A preferred embodiment uses aminosilanes for the reaction with the isocyanate prepolymers, in particular α-functionalized silanes and particularly preferably α-aminosilanes. Mixtures of several silanes can also be used.

The quantity of the silane compounds to be reacted is selected so that all the isocyanate groups of the prepolymer have reacted with a nucleophilic group of the silane compound. It is possible for a small excess of nucleophilic silanes to be used. In this way it can be ensured that no free isocyanate groups are present in the silane-terminated prepolymers. Too large an excess of silanes should be avoided to keep the content of low molecular weight compounds small.

Another embodiment of the invention reacts the OH-functional polyesters and/or polyethers described above as a polymer backbone with silanes according to the above formula, with the proviso that Nu is an isocyanate group. In this case, this silane compound then contains hydrolyzable groups and an isocyanate group. Examples of such silanes are trimethoxysilylpropyl isocyanate, trimethoxysilylpentyl isocyanate, trimethoxysilylbutyl isocyanate or the corresponding triethoxy or tripropoxy compounds. The corresponding dialkoxyalkylsilyl isocyanate compounds are also suitable.

The quantity of the isocyanatosilane compounds is selected such that the molar quantity of isocyanate groups corresponds to the molar quantity of the OH groups of the hydroxy-functional polyol. In this case, silane-functional prepolymers are also obtained.

A further embodiment selects the polymers mentioned above as the polymer backbone in such a way that they contain functional groups which can react with silane compounds, which also have an epoxy group or an anhydride group in addition to the hydrolyzable groups. In this case the polymers, in particular the polyols, are then linked with the hydrolyzable silane groups via ester groups or glycidyl ethers.

Prepolymers that are suitable according to the invention must have crosslinkable silane groups. The number of hydrolyzable silane groups per molecule should be at least two or more. In a particular embodiment, the silane groups are terminal to the polymer chain. The prepolymers should preferably be free from NCO groups.

The reaction products that are suitable according to the invention are prepolymers containing silane groups. These prepolymers have on average two or more urethane groups, preferably two to four. The glass transition temperature of the reaction products in solvent-free form should be between −40 and 0° C., in particular between −35° C. and −10° C. (measured with DSC). The glass transition temperature can be influenced by the quantity of aromatic fractions of polymer backbone or isocyanate. It has been shown that silane-reactive prepolymers which have been produced on the basis of isocyanates with aromatic rings are particularly suitable. Examples of these are TDI, NDI, 4,4'-MDI, 2,4-MDI, MXDI or TMXDI reacted with the starting polyols.

From the silane-functionalized prepolymers described above, laminating adhesives can be formulated. It is possible for additional ingredients, such as e.g. solvents, plasticizers, catalysts, stabilizers, adhesion promoters and, in a less preferred embodiment, pigments and fillers, to be contained in these laminating adhesives.

According to the invention, the one-pack laminating adhesive must additionally contain compounds having functional groups which can react with alcohols. It is preferred in this case if the reaction between alcohol and reactive group of the selected compound is an addition reaction. Preferably, no low molecular weight substances should be released in this reaction. Particularly suitable as a functional group are anhydrides of organic carboxylic acids. These can be monomeric carboxylic acid anhydrides, particularly those that are solid at 30° C., such as e.g. maleic anhydride (MA), phthalic anhydride, trimesic anhydride or derivatives of such compounds. Oligomers of compounds containing more than one organic anhydride group can also be used.

A particular embodiment of the invention uses polymers with a molecular weight greater than 1000 g/mol which have anhydride groups. Suitable polymers are known, particularly those with MA groups. These can be incorporated into the corresponding polymers by copolymerization; it is also possible for MA to be grafted onto polymers. Examples of suitable copolymers are copolymers of MA with styrene, vinyl acetate or (meth)acrylates. Examples of copolymers that can be grafted with MA are base polymers of polypropylene, polystyrene, polyesters or polybutadienes. These can be grafted by known methods after their production in a polymer-analogous reaction with MA. The content of MA in the suitable polymers may differ, being from 3 mole % up to approx. 60 mole % of anhydride groups. According to the invention, it is advantageous if higher ratios of MA are present in the polymer, in particular from 10 to 55 mole %.

A particularly preferred embodiment uses MA-styrene copolymers. These have a content of between 20 and 55 mole % MA. These are solid substances.

The quantity of the polymers or oligomers should be between 1 and 20 wt. %, based on the laminating adhesive, in particular between 2 and 15 wt. %. The quantity can be selected so that the quantity of anhydride groups corresponds to the quantity of alkoxy groups in the adhesive according to the invention. An excess can also be used. Any low molecular weight substances carrying nucleophilic groups that may additionally be present, such as amine-containing compounds, can also react with this component.

As other additives that are optionally contained in the adhesive, plasticizers can be contained, for example. Suitable plasticizers are e.g. medicinal white oils, naphthenic mineral oils, paraffinic hydrocarbon oils, polypropylene, polybutene, polyisoprene oligomers, hydrogenated polyisoprene and/or polybutadiene oligomers, phthalates, adipates, benzoates, vegetable or animal oils and derivatives thereof. As stabilizers or antioxidants that can be used, phenols, sterically hindered phenols of high molecular weight, polyfunctional phenols, sulfur- and phosphorus-containing phenols or amines can be selected.

An adhesive according to the invention can also contain pigments or fillers. The quantities should be from 0 to 5 wt. %. The adhesive should preferably be transparent. For this reason, nanoscale fillers are particularly suitable. Fillers can also be selected which have a suitable refractive index in the adhesive, so that a transparent or only slightly cloudy adhesive is obtained.

It is possible for silane compounds also to be added to the adhesive as adhesion promoters. As adhesion promoters, the above-mentioned silanes or preferably organofunctional silanes, such as (meth)acryloxy-functional, epoxy-functional or non-reactively substituted silanes can be used. In a preferred embodiment, 0.1 to 3 wt. % of such silanes are added to the adhesive. Examples of these are 3-acryloxypropyltrialkoxysilane or 3-methacryloxypropyltrialkoxysilane; epoxy-functional silanes, such as 3-glycidyloxymethyltrimethoxysilane, 3-glycidyloxymethyltriethoxysilane, 2-glycidoxyethyltrimethoxysilane; vinyltrimethoxysilane, alkyltriethoxysilane or corresponding di- or trialkoxy derivatives. These may optionally be incorporated into the polymer network.

An adhesive that is suitable according to the invention can also contain catalysts as an additional additive that may optionally be present. As catalysts, all known compounds that can catalyze the hydrolytic cleavage of the hydrolyzable groups of the silane groupings and the subsequent condensation of the Si—OH groups to siloxane groupings can be used. Examples of these are titanates, such as tetrabutyl titanate or titanium tetraacetylacetonate; bismuth compounds, such as bismuth tris-2-ethylhexanoate; tin carboxylates, such as dibutyltin dilaurate (DBTL), dibutyltin diacetate or dibutyltin diethylhexanoate, tin oxides, such as dibutyltin oxide and dioctyltin oxide; organoaluminum compounds, such as aluminum trisacetylacetonate; chelate compounds, such as zirconium tetraacetylacetonate; amine compounds or their salts with carboxylic acids, such as octylamine, cyclohexylamine, benzylamine, dibutylamine, monoethanolamine, di- or triethanolamine, triethylamine, tripropylamine, tributylamine, diethanolamine, dipropylamine, dibutylamine, diethylenetriamine, triethylenetetramine, triethylenediamine, guanidine, morpholine, N-methylmorpholine and 1,8-diazabicyclo-(5,4,0)-undecene-7 (DBU), silane compounds with amino groups. The catalyst or mixtures are used in a quantity of 0.01 to approx. 5 wt. %, based on the total weight of the preparation. 0.05 to 4 wt. %, particularly preferably from 0.2 to 3 wt. % catalyst, are preferred. It is preferred if the adhesive does not contain any tin catalysts. In particular, other heavy metal-containing catalysts can also be avoided.

According to the invention, the adhesives also contain solvents. These are the conventional solvents that can evaporate at temperatures up to 130° C., in particular having a boiling point below 100° C. The solvents can be selected from the group of the aliphatic hydrocarbons, aromatic hydrocarbons, ketones or esters. The solvents are used for lowering and adjusting the viscosity. The proportion of solvents can vary within wide limits, for example from 19 to 75%, based on the adhesive. It is known to adjust the adhesive to be highly viscous in one delivery form; it can then be diluted to a suitable viscosity with further solvent before application. The sum of all the components should be 100%. For good storage stability, it is useful if the solvents used according to the invention contain only small proportions of water or no water.

The solvents of the adhesives according to the invention can be added during production. However, another embodiment operates in such a way that only a proportion of the solvents are used during production, to adjust the viscosity to be appropriate for production. Another part of the solvents in the context of the composition according to the invention, however, is added to the adhesive shortly before processing in order to obtain a suitable application viscosity. In this embodiment, it is possible that the solvents that are not added until shortly before application of the adhesive also contain organic monofunctional alcohols, at least in part. These alcohols should evaporate at a temperature below 130° C. in accordance with the requirements for the solvents. In particular methanol, ethanol or propanol is suitable. The quantities of alcohol, based on the total solvent content, should be no more than 50%, in particular less than 25%.

It has been shown that the processing stability of the adhesive with the solvents is sufficiently long. For a period of up to 6 hours, the diluted adhesives can be processed without changing the reactivity significantly during crosslinking. Since the solvents evaporate during application, the mode of operation of the adhesive according to the invention is not impaired.

The viscosity of the laminating adhesives should be low at application temperature. This can be up to 45° C., and in particular up to 35° C. The viscosity of the suitable laminating adhesives should be between 50 and 20000 mPas measured at 15 to 45° C., preferably 100 to 5000 mPas (measured by the Brookfield method according to ISO 2555). For application, the adhesive is usually diluted with solvent. The viscosity here can be from 50 mPas to 800 mPas (at 20 to 45° C.). Application-related measurements should be between 12 and 28 seconds (Ford cup. 4 mm, ASTM D 1200). The solids content in the form as applied is preferably between 15 and 60%, and particularly preferably 30 to 50 wt. %. Since rapid further processing is necessary, the adhesives should crosslink quickly and develop good cohesion and adhesion. According to the invention, crosslinking of the applied adhesive is possible even with only a low moisture content of the substrates to be bonded. This can also be supported by a proportion of moisture in the adhesive.

The adhesives according to the invention are stable on storage. It is conventional to store a low-solvent form. In this case, this can have a higher viscosity. In one embodiment, it is possible to heat these reduced-solvent laminating adhesives for application and then to apply them. In another embodiment, the adhesive is diluted with solvents to a low viscosity for use and is then applied.

Particular embodiments of the adhesive according to the invention comprise:
one-pack adhesives, wherein the polyester prepolymer is produced from polyester polyols reacted with a molar excess of diisocyanates to form NCO polyester prepolymers, with subsequent reaction of all NCO groups of the NCO prepolymer with bifunctional silane compounds containing alkoxy groups and a nucleophilic group;
one-pack adhesives, wherein the prepolymer is produced from polyester polyols reacted with NCO-substituted alkylalkoxysilanes;
one-pack adhesives, wherein a polyether prepolymer produced from polyether polyols, reaction with bifunctional silane compounds which contain alkoxy groups and a nucleophilic group;
one-pack adhesives, wherein alkoxysilanes are additionally contained as an adhesion promoter;
one-pack adhesives, wherein the quantity of the alcohols in the total solvent is less than 50 wt. %;
one-pack adhesive having no NCO groups.

The invention also provides the use of the crosslinkable silane-functionalized adhesives according to the invention for the production of multi-layer films. As film materials for the production of multi-layer films, the known flexible films can be used. These are substrates of thermoplastic polymers in film form, for example polyolefins, such as polyethylene (PE) or polypropylene (PP, CPP, OPP), polyvinyl chloride (PVC), polystyrene (PS), polyesters such as PET, polyamide, organic polymers such as cellophane, and metal foils or paper are also possible as substrates. These film materials can also be modified, e.g. by modifying the polymers with functional groups, by metal or oxide coatings or additional components such as pigments, dyes or foamed layers can be contained in the film. They can be dyed, printed, colorless or transparent films.

In the use according to the invention, two or more identical or, in particular, different films are bonded together using a one-pack adhesive which is suitable according to the invention. In one embodiment of the invention, a film can already be printed in color before applying the laminating adhesive. A liquid laminating adhesive according to the invention is then applied onto the optionally pretreated film. This can take place by printing methods that are known per se, e.g. with anilox rollers or flat rollers, or the adhesive is sprayed on through nozzles or applied using slot nozzles. The application method is to be selected according to the viscosity of the adhesive.

By means of the selection of the crosslinkable one-pack laminating adhesives according to the invention, it is possible to obtain a low application viscosity. The adhesive that is suitable according to the invention has a low viscosity, and therefore an application in a low layer thickness of 1 to 25 µm, in particular 2 to 15 µm, is possible.

The multi-layer film is produced by joining a film coated with the adhesive and a second film. A bonding of two coated films is possible, but less preferred. The bonding can take place under pressure and at elevated temperature. Several films may optionally also be bonded together. Such lamination methods are known to the person skilled in the art.

The adhesive according to the invention can be used in particular as a laminating adhesive. Here, the adhesives are applied in a thin layer onto a film. Immediately thereafter, the solvents contained evaporate, after which a second film is applied onto the adhesive layer and pressed using pressure. Using the composition according to the invention, it may also be possible to use a proportion of low molecular weight alcohols, for example methanol, ethanol or propanol, as solvents. These are less harmful than other solvents under foodstuffs regulations. The alcohols evaporate rapidly during the application process. Only small quantities of residual alcohols or those from the crosslinking reaction are captured by the oligomer/polymer having anhydride groups which is present. By means of the mode of operation according to the invention, other solvents can thus be reduced and avoided.

By selecting crosslinking via alkoxysilane groups, it is possible for the adhesive to crosslink rapidly. No bubbles are formed by the reaction, which are difficult to avoid in isocyanate-based adhesives in highly reactive systems. The adhesives according to the invention have the advantage that the necessary solvents do not have to be dried. Thus, production, storage and application methods for the adhesives according to the invention are simplified. A further advantage of the laminating adhesive according to the invention is its good flexibility. It has been shown that the adhesive according to the invention has a predetermined $T_g$. These adhesives also display good cohesion of the bonded multi-layer films even before crosslinking.

The $T_g$ of the crosslinked adhesive should be between $-15$ and $+30°$ C., in particular between $-10$ and $+20°$ C. A sample of less than 0.5 g of the complete adhesive, which has been heated from 0 to 200° C. at a heating rate of 10 K per minute, is considered to be the solvent-free crosslinked state. The $T_g$ of the crosslinked material can then be determined by DSC (differential scanning calorimetry).

By means of the selection of the silane functional prepolymers, it is simultaneously ensured that good instant tack is possible between the films being bonded. The solvents evaporate during the application process. During crosslinking of the one-pack adhesives according to the invention, alcohols are formed. These react slowly with the additional polymers/oligomers with MA groups that are present, so that the content of volatile, extractable or migratable alcohols is significantly reduced. The crosslinking rate is positively influenced by the additional polymers, and alcohols are removed from the reaction system.

The invention also provides a multi-layer film which is bonded with a laminating adhesive that is suitable according to the invention, wherein the known plastics films, for example of polypropylene, polyethylene, polyester, PVC, polyamide or other, can be used as a substrate. On this film, a continuous layer is produced with an adhesive according to the invention, which is bonded with a second identical or different film immediately after application. In addition to the two-layer films, it is also possible to produce a multi-layer film by means of further steps. One embodiment of the invention bonds transparent films, in which case it is useful if the adhesive according to the invention is also clear and not discolored.

Other layers can also be contained in these multi-layer films, for example comprising paper, metal foils or other barrier layers. These multi-layer films can be further processed quickly after bonding, since there is high initial tack and rapid crosslinking. There is no need for time-consuming storage while waiting for cross-linking or side reactions.

The adhesive according to the invention displays good adhesion between the different layers. In particular, it is colorless and transparent. It displays no bubbles or defects in the adhesive layer. Therefore, it is especially suitable as a laminating adhesive for bonding flexible substrates in the form of films. Furthermore, the alcohols forming during crosslinking are captured by the polymers that contain anhydride groups. This results in high molecular weight reaction products, which are not capable of migration. Thus, crosslinked adhesive layers are obtained which contain only small quantities of substances that are capable of migration. Such multi-layer films are therefore particularly suitable for the packaging industry, for example for the production of packaging for foodstuffs or medical products.

EXAMPLES

Example Polyester 1

A polyester was prepared from adipic acid and isophthalic acid together with ethylene glycol.

The polyester had a molecular weight of approx. 2000 g/mol. The OH value was approx. 58, and the acid value was less than 2.

Example Polyester 2

A polyester was prepared from adipic acid, isophthalic acid, azelaic acid and phthalic acid together with diethylene glycol, ethylene glycol, propylene glycol and neopentyl glycol.

The polyester had a molecular weight of 5100 g/mol. The OH value of the polyester was approx. 22.

Examples of Adhesives

Example 3a 51.5 parts of polyester 1 were dissolved in 38.5 parts of ethyl acetate and then reacted with 6 parts of TDI 80. 4.3 parts of bis(3-triethoxysilylpropyl)amine were then added.

The resulting product had a solids content of 62%. It contained no further isocyanate groups. The viscosity was approx. 1400 mPas (20° C.). The $T_g$ (crosslinked) was $-2°$ C.

Example 3b

To the adhesive of example 3a, 1.6 parts (approx. 2.5% based on solids) of a styrene copolymer containing approx. 50 wt. % MA building blocks were added and the mixture was homogenized.

Example 4a 63.0 parts of polyester 2 were dissolved in 30.0 parts of ethyl acetate and then reacted with 3.45 parts of TDI 100 and 4.15 parts of bis(3-triethoxysilylpropyl)amine.

The resulting product had a solids content of 70%. It contained no further isocyanate groups. The viscosity was approx. 7750 mPas (20° C.).

The $T_g$ (crosslinked) was +4° C.

Example 4b

To the adhesive of example 4a, 1.7 parts (approx. 2.5% based on solids) of a styrene copolymer containing approx. 50 wt. % MA building blocks were added and the mixture was homogenized.

Example 5a 61.2 parts of polyester 2 were dissolved in 34.5 parts of ethyl acetate and then reacted with 5.0 parts of TDI 100 and 1.4 parts of n-cyclohexylaminomethylmethyldiethoxysilane. The resulting product had a solids content of 65%. It contained no further isocyanate groups. The viscosity was approx. 6700 mPas (20° C.).

Example 5b

To the adhesive of example 5a, 3.5 parts (approx. 5% based on solids) of a styrene copolymer containing approx. 50 wt. % MA building blocks were added and the mixture was homogenized. The viscosity was approx. 6800 mPas (20° C.).

Example 5c

To the adhesive of example 5a, 2 parts (approx. 3% based on solids) of phthalic anhydride were added and the mixture was homogenized. The viscosity was approx. 6700 mPas (20° C.).

All of the adhesives were diluted with ethyl acetate before application (series 1) to a solids content of approximately 31%.

The viscosity here was less than 800 mPas (20° C.).

The adhesives of examples 3a, 3b, 5a, 5b were diluted with a mixture of ethyl acetate/ethanol in such a way that a total of 10% ethanol was contained in the solvent (series 2), solids content approx. 33%.

Bonding:

Films based on polyethylene (PE) were coated with the adhesives according to the invention of test series 1 using a knife. The layer thickness was 5 µm.

Another film was similarly coated with a layer thickness of 10 µm. The coated surface was dried in air at 30° C. for approx. 1 min. Then, a second film based on OPP was squeezed onto each coated film using a roller.

PET films were coated with adhesive from test series 2 with a layer thickness of 3 g/m² using a knife. After drying in air, these films were bonded with an Al foil.

After 6 days and 14 days, the bonding of the film substrates was determined. In all cases, good adhesion with one another was determined.

From the bonded films, the content of ethyl acetate and ethanol was determined by headspace GC after 24 hours.

| Examples (series 1) | EtOH | EtOAc |
|---|---|---|
| 3a | 30 | 2 mg/m² |
| 3b | 5 | 2 |
| 4a | 20 | 2 |
| 4b | 7 | 2 |

| Examples (series 1) | EtOH | EtOAc |
|---|---|---|
| 5a | 15 | 2 |
| 5b | 5 | 2 |

The tests show that, with the addition of the MA-containing components, the alcohol content is reduced.

| Examples (series 2) | EtOH | EtOAc |
|---|---|---|
| 3a (bonded immediately after mixing) | 50 | 3 mg/m² |
| 3b | 15 | 2 |
| 3a (bonded 2 h after mixing) | 50 | 3 mg/m² |
| 3b | 14 | 3 |
| 3a (bonded 4 h after mixing) | 40 | 3 mg/m² |
| 3b | 16 | 3 |
| 3a (bonded 24 h after mixing) | 34 | 4 mg/m² |
| 3b | 12 | 2 |
| 5b (bonded immediately after mixing) | 50 | 3 |
| 5a | 14 | 3 |
| 5b (bonded 24 h after mixing) | 45 | 3 |
| 5a | 14 | 3 |

The tests show that, with a proportion of EtOH in the solvent, the measured values in the bonded film are nevertheless reduced. There is also a sufficiently long stability of these adhesives for processing, the effect of the reduction of alcohols being maintained.

The invention claimed is:

1. A crosslinkable one-pack adhesive for bonding flexible multi-layer films, containing:
    a) 25 to 80 wt. % of a prepolymer selected from polyester prepolymers, polyurethane prepolymers, and mixtures thereof, wherein the prepolymer has at least two crosslinkable alkoxysilane groups and possesses a molecular weight of 2000 to 30000 g/mol, and wherein at least ½ of the prepolymer is based on polyester polyol,
    b) 75 to 19 wt. % of organic solvents with a boiling point of up to 130° C. selected from esters, alcohols or combinations thereof,
    c) 1 to 20 wt. % polymers, oligomers and/or monomers which contain one or more anhydride groups, wherein the polymers, oligomers and/or monomers are solid compounds at 25° C. and contain 5 mole % to 60 mole % anhydride groups,
    d) 0 to 15 wt. % additives,
wherein the viscosity of the adhesive is between 50 and 20000 mPas (according to DIN ISO 2555), measured at 15 to 45° C. and the adhesive does not contain any catalysts.

2. The one-pack adhesive according to claim 1, wherein the polyester prepolymer or polyurethane prepolymer is produced from polyester polyols having a molecular weight of 400 to 25000 g/mol, which comprise at least two OH groups.

3. The one-pack adhesive according to claim 1, wherein the prepolymer contains trialkoxysilane groups.

4. The one-pack adhesive according to claim 1, wherein the prepolymer contains triethoxysilane groups or trimethoxysilane groups.

5. The one-pack adhesive according to claim 1, wherein the polymers, oligomers and/or monomers with anhydride groups have cyclic anhydride groups.

6. The one-pack adhesive according to claim 5, wherein the adhesive contains 2 to 15 wt. % polymers with maleic anhydride (MA) groups.

7. The one-pack adhesive according to claim 5, wherein the adhesive contains 2 to 15 wt. % MA/styrene copolymers or MA/(meth)acrylate copolymers.

8. A flexible multi-layer film comprising a plurality of films selected from polymer films, paper, foils, metal foils and surface-treated films bonded together by cured reaction products of the one-pack adhesive of claim 1.

9. The one-pack adhesive according to claim 1, wherein the glass transition temperature ($T_g$) of the crosslinked adhesive is between −15 and +30° C.

10. A flexible multi-layer film for the production of food packaging comprising a first film layer selected from polyolefin; polyvinyl chloride; polystyrene; polyester; polyamide; cellophane; metal foil or paper; a second film layer selected from polyolefin; polyvinyl chloride; polystyrene; polyester; polyamide; cellophane; metal foil or paper; and a crosslinkable one-pack adhesive disposed between the first and second layers, the adhesive containing:
   a) 25 to 80 wt. % of a prepolymer selected from polyester prepolymers, polyurethane prepolymers, and mixtures thereof, wherein the prepolymer has at least two crosslinkable alkoxysilane groups and possesses a molecular weight of 2000 to 30000 g/mol, and wherein at least 50% of the prepolymer is based on polyester polyol,
   b) 75 to 19 wt. % of organic solvents with a boiling point of up to 130° C., the solvents selected from esters, alcohols or combinations thereof,
   c) 1 to 20 wt. % polymers, oligomers and/or monomers which contain one or more anhydride groups, wherein the polymers, oligomers and/or monomers are solid compounds at 25° C. and contain 5 mole % to 60 mole % anhydride groups,
   d) 0 to 15 wt. % additives,
   wherein the viscosity of the crosslinkable adhesive is between 50 and 20000 mPas (according to DIN ISO 2555), measured at 15 to 45° C. and the adhesive does not contain any catalysts.

11. The flexible multi-layer film of claim 10 wherein the first layer is polyolefin.

12. The flexible multi-layer film of claim 10 wherein the first layer is polyolefin and forms one exterior surface of the multi-layer film and the second layer is polyester and forms an opposing exterior surface of the multi-layer film.

13. The flexible multi-layer film of claim 10, comprising a third film layer selected from polyolefin; polyvinyl chloride; polystyrene; polyester; polyamide; cellophane; metal foil or paper bonded to the first film layer and the second film layer.

14. The flexible multi-layer film of claim 10 comprising a third barrier layer bonded to the first film layer and the second film layer.

15. The flexible multi-layer film of claim 10 wherein cured reaction products of the adhesive bond the first film layer to the second film layer.

* * * * *